March 8, 1955 A. R. BANKS 2,703,656
MECHANISM FOR UNLOADING DRUMS FROM VEHICLES
Filed Aug. 1, 1952 2 Sheets-Sheet 2
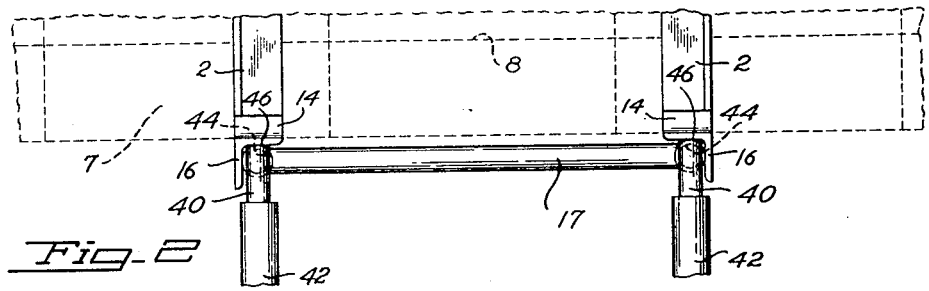
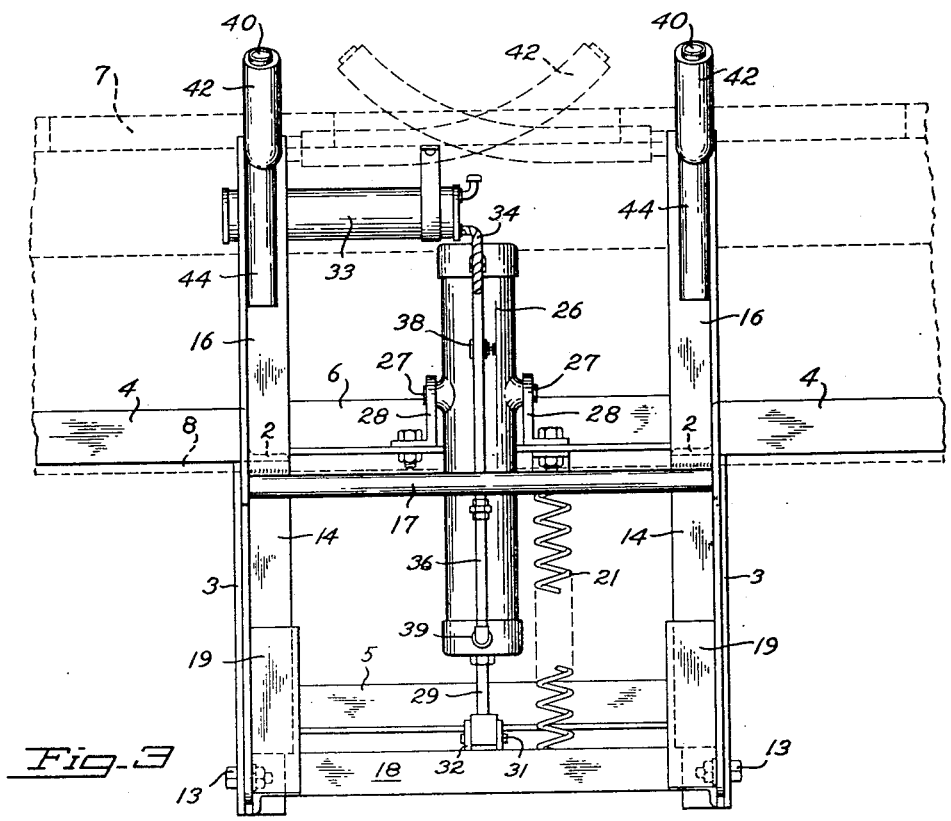
INVENTOR
AUBREY R. BANKS
BY Charles S. Evans
his ATTORNEY

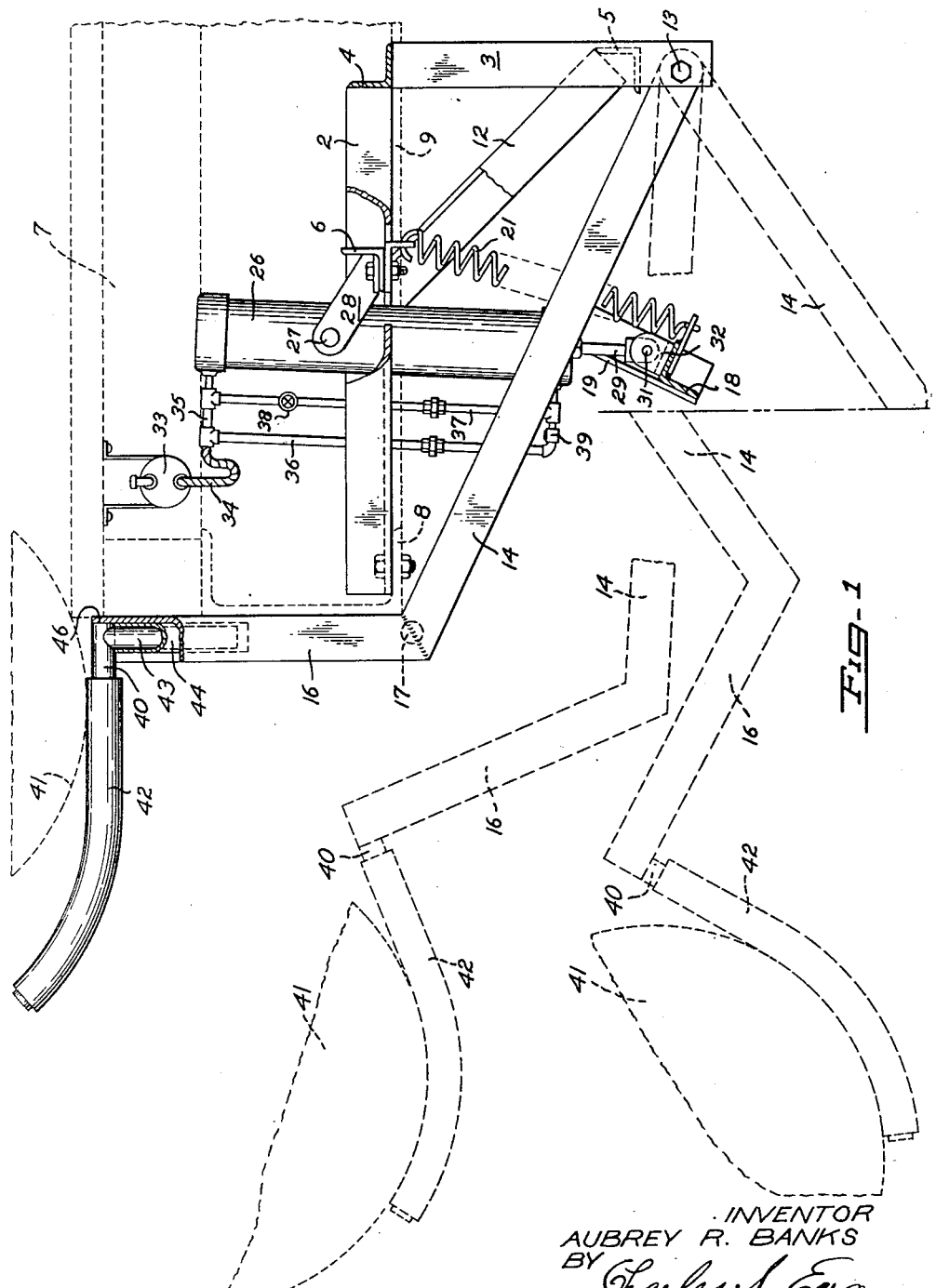

United States Patent Office 2,703,656
Patented Mar. 8, 1955

2,703,656

MECHANISM FOR UNLOADING DRUMS FROM VEHICLES

Aubrey R. Banks, Woodside, Calif.

Application August 1, 1952, Serial No. 302,182

1 Claim. (Cl. 214—77)

My invention relates to devices for facilitating the lowering of barrels or drums from a truck to the lower level of street or platform; and one of the objects of the invention is to provide such a device which operates automatically to lower the drum upon its receipt, discharge it, and then effect a recovery movement to loading position.

Another object of the invention is the provision of such an unloading device which may be readily installed below the rear end of a truck body.

Still another object of the invention is the provision of such an unloading device in which the operational speed and particularly the speed of the lowering movement may be controlled and adjusted as required by the nature of the drums or barrels handled.

The invention possesses other objects, some of which with the foregoing will be brought out in the following description of the invention. I do not limit myself to the showing made by the said description and the drawings, since I may adopt variant forms of the invention within the scope of the appended claim.

Referring to the drawings:

Fig. 1 is a side elevational view showing my mechanism installed on the back end of a truck. The end of the truck is shown in short dash lines; and portions of the figure are broken away to show the underlying structure. In dash lines the figure shows the unloading mechanism in an intermediate position and in the drum-discharging lower position.

Fig. 2 is a plan view. A portion of each of the cradle arms is broken away to shorten the view.

Fig. 3 is a rear elevation.

Vast quantities of liquids, such as chemicals, oils, liquors and wines are packaged in barrels or drums and carried from place to place on trucks. Drums of lubricating oil for example may weigh as much as 450 pounds, and of many chemicals, in excess of 500 pounds. Unloading such packages from a truck bed several feet above ground level involves consideration of a number of elements, including manpower, time, damage to package, injury or loss of contents, damage to unloading area, and injury to the truck driver.

Heavy pads have been used on which the more rugged drums or barrels have been dropped from the end of the truck bed. Inclined skids have also been used to slow the descent of more fragile containers. And many heavy drums have been eased to the ground by unaided muscular strength.

All of these methods of unloading are wasteful of time and human energy and productive of damage and loss; and it is therefore the broad purpose of my invention to provide a unit of mechanism adapted to be permanently mounted on a truck below the bed and at the rear end where unloading usually takes place; and so arranged that the drum to be unloaded is merely rolled by the operator off the end of the truck bed and upon cantilever cradle arms there extended to receive it and stop its rolling. Instantly the cradle starts an adjustably controlled fall, pivoting about a horizontal axis located below the truck bed, and successively reaching the positions shown by the dash lines of Fig. 1 to end when the cradle arms meet the ground, at which time they are inclined so that the drum rolls off of them and toward the point of temporary placement.

Preferably the cradle arms are curved to a somewhat flatter arc than the largest drum presents; and the proportions and arrangement are such that the drum rolls free of the cradle at a speed similar to that at which the operator impells the drum on the truck bed toward the arms, and in substantial continuity with the downward movement of the cradle, so that both at the top or loading end and at the bottom or discharge end of the cradle fall, there is no abrupt change in direction of movement of the drum and substantially no shock imposed on it.

Hydraulic means are utilized in limiting the falling speed of the loaded cradle; and spring means are provided for effecting recovery of the cradle to its upper position as soon as the drum rolls free.

Since the drums are lowered and permitted to roll free of the cradle automatically, requiring only to be rolled toward the waiting cradle arms, it will be apparent that but one operator is required for the unloading, and he remains on the truck.

In detail my unloading mechanism comprises a frame conveniently formed of pipe and angle bars welded together. The top of the frame is formed of spaced horizontal angle bars 2; and the end of the frame by spaced vertical bars 3, the upper end of each of which is secured to an end of a bar 2. Cross bars 4 and 5 adjacent the ends of the vertical members and cross bar 6 between the horizontal members hold the sides thus formed in rigid spaced relation.

In use the frame is bolted in position below the truck bed 7, and upon the lower flanges 8 and 9 of the end and side channels respectively of the truck chassis. A diagonal brace 12 is preferably welded between the horizontal and vertical frame members on each side; and similar diagonal bracing between the two vertical frame members is advisable, since the lower end of the frame formed by the vertical members provides the pivotal mounting of the load carrying cradle, and as such is severely stressed in all directions during use.

Pivotally mounted on the lower end of the fixed frame by pivot pins 13 is the cradle frame formed by side members 14 which extend upwardly to the lower outer corner of the rear channel 8 of the chassis, and then vertically in the extension members 16 to a point just below the level of the truck bed. These two side members are rigidly connected at the angle by a cross member 17.

The sides of the cradle frame are further strengthened and braced by a bridge bar 18, preferably an angle bar. So that this bar may be better positioned to serve as a connecting base for the control devices, it is bridged across the ends of two short legs 19 extending downwardly from each side bar 14 as shown in Fig. 1.

A long tension coil spring 21 is interposed between bridge bar 18 and cross bar 6, bridged across the two main frame members 2. The lever arms and spring are arranged and adapted to permit lowering of the cradle under load, and then to effect the recovery lifting of the cradle back to its upper position and hold it there securely during such time as the cradle is idle.

Means are provided for adjustably limiting the speed at which the loaded cradle is permitted to fall. This is best accomplished by a hydraulic cylinder and connections including a cylinder 26 having trunnions 27, journaled in bracket arms 28 fixedly secured to the bridge bar 6. The cylinder encloses a piston on the inner end of piston rod 29, the outer end of which is connected by journal pins 31 with the yoke 32, fixed on the bridge bar 18, so that as the cradle frame swings downwardly the piston in the cylinder moves downwardly in the cylinder, the latter turning on its trunnion mounting in compensation of the change in position of the yoke 32.

A reserve supply of hydraulic fluid and valved pipe connections with the cylinder are provided to insure proper operation and an adjustable control of the speed at which the piston can travel. A reservoir 33 is fixed at any convenient place above the level of the rest of the system; and is connected by flexible hose 34 and pipe 35 with the upper end of cylinder 26, and by pipe 36 with the lower end. These pipes are connected by a by-pass 37 having a valve 38 to adjust the flow of fluid through the by-pass. A check valve 39, opening toward the cylinder is disposed in the pipe 36, so that while the adjustable valve 38 controls the speed of downward movement of the piston in cylinder 26, the valve 39 permits additional fluid to flow into the cylinder within the limit imposed by the size of the passage, upon the recovery movement of the piston and connected cradle frame.

A pair of cradle arms 40 are selectively arranged on the cradle frame in either of two positions. Each arm is conveniently formed of a piece of pipe curved about as shown to provide a suitable stop and seat for the drums 41; and preferably sheathed in a shock and noise deadening rubber hose 42. One end of each arm is welded to a short head 43 of pipe, fitting easily into a socket piece 44, welded into the angle bar extension 16 near its upper end. The arm 40 extends past the head 43 a very short distance to form a flat end 46 adapted to seat squarely against either of the two inner faces of the angle bar.

When the cradle is to be used, the arm head is seated in its socket as shown best in Figs. 1 and 2, the arm end abutting against the forward flange of the angle bar and thereby holding the arms securely in extended position to receive the drums. When unloading has been completed, the cradle arms are lifted out of their sockets and reseated therein, extending toward each other and crossed as shown in dash lines in Fig. 3, the arm ends abutting against the lateral flanges of the angle bars and holding the arms in out-of-the-way position during the period of disuse.

I claim:

Mechanism for unloading drums from a truck bed to pavement comprising a main frame for fixed mounting under the truck bed, a cradle frame pivotally mounted at one of its ends on the main frame for movement of its other end upwardly toward and downwardly from the main frame, spring means interposed between the cradle frame and the main frame to effect recovery of the cradle frame from its lower to its upper position, means including an hydraulic cylinder interposed between the cradle and main frames for restraining movement of the cradle frame, demountable cradle arms selectively extending from the cradle frame to receive a drum or laterally across the end of the cradle frame in position of disuse, and means including a flat end on each cradle arm for locking the arms in selected position.

References Cited in the file of this patent

UNITED STATES PATENTS

| | | |
|---|---|---|
| 1,802,409 | Deutscher et al. | Apr. 28, 1931 |
| 2,234,599 | Johnston | Mar. 11, 1941 |
| 2,391,412 | Gorton | Dec. 25, 1945 |
| 2,456,805 | Wohlforth | Dec. 21, 1948 |
| 2,480,528 | Wachter | Aug. 30, 1949 |
| 2,670,861 | Fondriest et al. | Mar. 2, 1954 |

FOREIGN PATENTS

| | | |
|---|---|---|
| 89,655 | Switzerland | June 1, 1921 |
| 348,249 | Germany | Feb. 4, 1922 |
| 498,108 | Germany | May 19, 1930 |
| 113,577 | Australia | Aug. 14, 1941 |